Aug. 2, 1960 D. D. PETTIGREW ET AL 2,947,197
GUARDS FOR MACHINE TOOLS
Filed Aug. 19, 1957
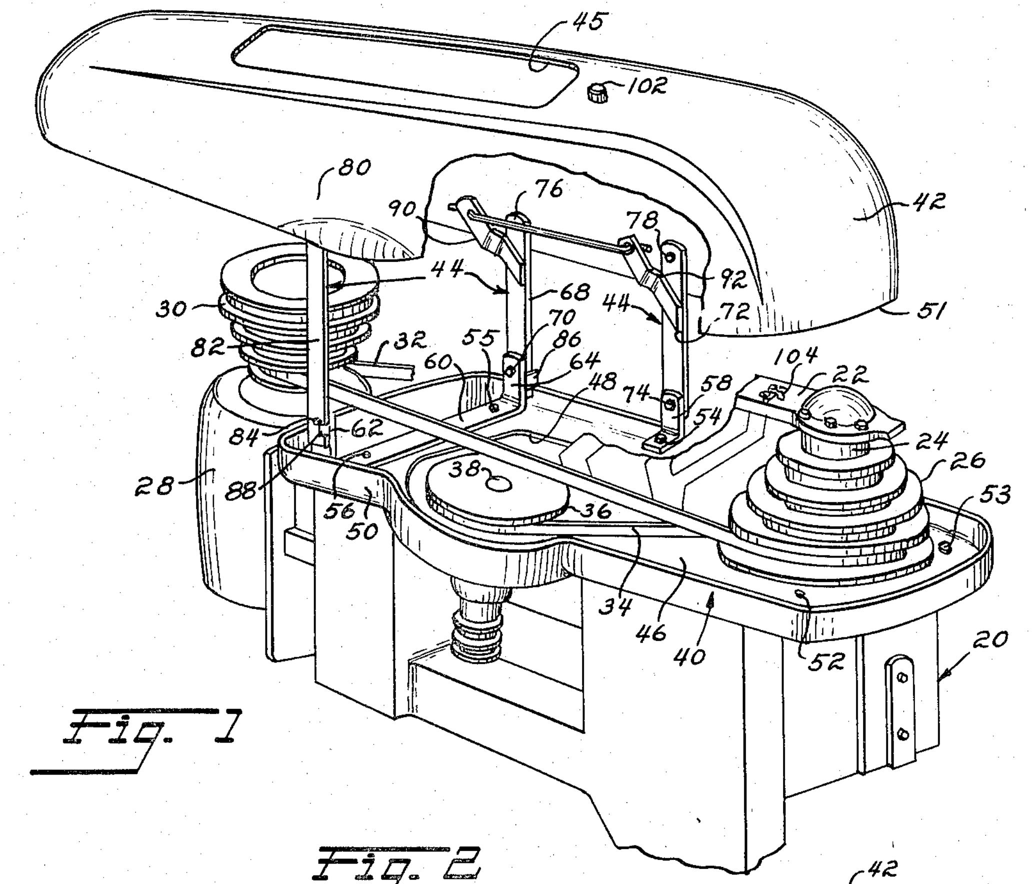
Fig. 1
Fig. 2
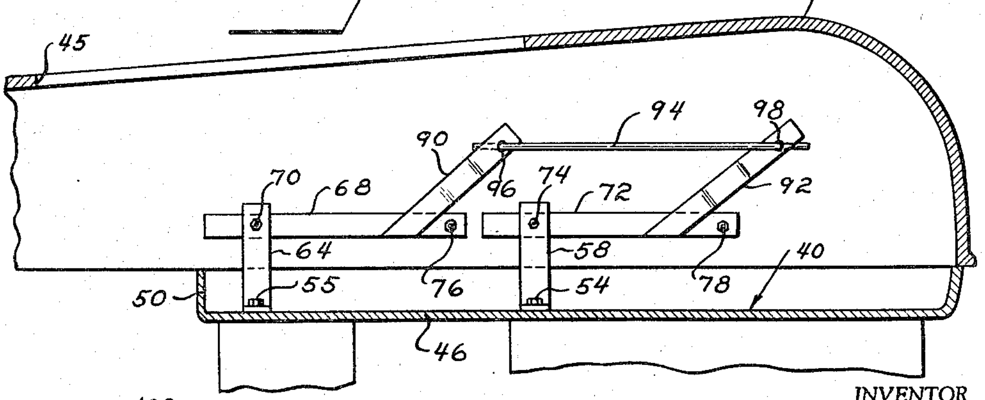
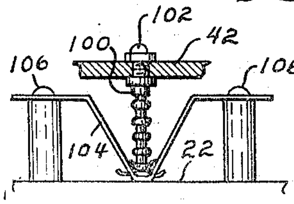
Fig. 3
INVENTOR
DAVID D. PETTIGREW
DONALD E. BELL
BY Strauch, Nolan + Neale
ATTORNEYS United States Patent Office 2,947,197
Patented Aug. 2, 1960

1

2,947,197

GUARDS FOR MACHINE TOOLS

David D. Pettigrew and Donald E. Bell, Pittsburgh, Pa., assignors to Rockwell Manufacturing Company, Pittsburgh, Pa., a corporation of Pennsylvania Filed Aug. 19, 1957, Ser. No. 678,975

3 Claims. (Cl. 74—611)

This invention relates to guards for machine tool drive assemblies and more particularly to guards which may be readily moved between a position in which the drive assemblies are completely enclosed and a position in which the drive assemblies are fully accessible for adjustment, inspection and service.

The guards of the present invention are particularly adapted for use with motor driven drill presses. In such units, the necessary drive pulleys and belts are grouped in a head assembly at the top of the drill press. In order to protect the operator as well as to protect the mechanism, it is necessary to provide a guard or cover assembly which substantially completely encloses the belt drive mechanism.

Generally the drive assemblies include multiple driving and driven pulleys to permit regulation of the spindle speed by physically transferring the drive belt. To facilitate performance of this operation as well as to permit inspection and servicing of the head assembly, it is necessary that the head guard be movable easily and quickly out of guarding position to permit access to the drive components.

It is a principal purpose and object of the present invention to provide improved guard assemblies satisfying these requirements.

It is a further important object of the present invention to provide improved guard assemblies for machine tool drives including a unique mechanism for supporting at least the top cover member of the guard assembly for quick and easy movement between a position in which the drive components are substantially completely enclosed and a second position in which the drive components are fully accessible to the operator.

In accordance with the preferred form of the present invention, these primary objects are attained by the provision of a two piece guard assembly of molded resin bonded glass fibers of the type sold under the trademark Fiberglas, the lower portion of which is rigid with the machine tool and the upper portion of which is mounted for movement with respect to the lower section by a unique parallelogram linkage mechanism which permits the upper section to be moved quickly and easily by the operator between a lowered position in which the drive components of the machine tool are fully enclosed and a raised position in which all of the drive components are fully accessible to the operator.

It is, accordingly, a further object of the present invention to provide improved lifting mechanisms for machine tool guard assemblies.

It is also an object of the present invention to provide improved machine tool guard assemblies which are of lightweight, rugged and relatively inexpensive construction.

2

Further objects and advantages of the present invention will become apparent as the description proceeds with the accompanying drawings in which:

Figure 1 is a perspective view of the guard assembly of the present invention as applied to a typical drill press showing the upper portion of the guard in raised position to provide access to the drive components of the head assembly;

Figure 2 is a fragmentary vertical section showing a portion of the guard in lowered position; and Figure 3 is an enlarged fragmentary transverse section showing details of the mechanism for locking the guard assembly in operative guarding position.

Referring now more particularly to the drawings, the illustrated drill press head assembly is, except for the guard assembly, of conventional construction and includes a main body casting 20 and upper bearing support 22 rotatably supporting the upper end of the spindle 24 on which a pulley 26 is non-rotatably secured. In accordance with conventional practice the head casting 20 is mounted for vertical adjusting movement on a support column not shown.

A drive motor 28 is mounted at the rear of the casting 20 and is provided with a drive pulley 30 drivingly connected to the spindle pulley 26 by a belt 32. The pulley 26 is drivingly connected by a belt 34 to a pulley 36 non-rotatably secured to a shaft 38 operatively connected by means not shown to a power feed mechanism which is optionally supplied on drill presses of this type. The mechanism thus far described is in all respects conventional and may be replaced by other equivalent mechanisms.

The adjustable guard assembly with which the invention is primarily concerned, comprises a lower shell-like section 40 rigid with the head casting 20, an upper shell-like section 42 having a smoothly curved exterior and the novel linkage assembly indicated generally at 44, by which the upper guard section is mounted for movement between the positions shown in Figures 1 and 2.

The upper and lower sections 40 and 42 are each of one piece construction and are molded from reinforced plastic impregnated fiber glass, which is strong, durable, lightweight, relatively inexpensive and of pleasing appearance. The upper section 42 is provided with an elongated central top opening 45 through which the main support column may extend when the upper section is either raised or lowered.

The lower shell section 40 is formed with a flat bottom portion 46 which is centrally cut away to form an opening 48 and which is provided with an annular upturned rim 50 extending entirely around the upper portion of the head casting 20. The rim 50 is adapted to be engaged by a mating rim 51 on the upper section 42 along the front and sides of the guard assembly. The lower guard asection 40 is rigidly secured to the upper end of the head casting 20 by bolts 52, 53, 54, 55 and 56, threaded directly into tapped openings in the upper surface of the head casting. The bolt 54 also secures an L-shaped bracket 58 to the head casting and the bolts 55 and 56 similarly secure a rear bracket 60 to the head casting. At its ends just inwardly of the rim 50 of the lower cover member, the bracket 60 is provided with upturned portions 62 and 64. The forward bracket 58 is provided with a similar upturned portion aligned with the upturned portion 64 on the rearward bracket.

A link 68 is pivotally secured by a nut and bolt assembly 70 to the portion 64 of the bracket 60 and an identical link 72 is pivotally secured to the forward bracket by a nut and bolt assembly 74 which is at the same height as the bolt 70. The opposite ends of the links 68 and 72 are pivotally secured to the upper cover section 42 by carriage bolt and nut assemblies 76 and 78 which are at the same distance above the lower edge of the cover 42. A similar carriage bolt and nut assembly 80 pivotally secures the upper end of a link 82 to the upper cover 42, at the same height as the bolts 76 and 78, the opposite end of the link 82 being pivotally secured to the bracket portion 62 by a nut and bolt assembly 84 which is directly aligned with the bolt 70. Carriage heads are employed on the bolts 76, 78 and 80 to permit them to seat snugly in corresponding square holes made in the fiber glass top cover 42 to prevent movement of the bolt heads which might cause an enlarging of the holes in the relatively soft cover material. The rear links 68 and 82 extend below the point of their pivotal attachment to the bracket 60 opposite abutments 86 and 88 mounted on the respective bracket portions 64 and 62 to limit counterclockwise movement of the links 68 and 82 as viewed in Figure 1.

The linkage mechanism also includes a pair of identical arms 90 and 92 welded to the respective arms 68 and 72 adjacent the outer ends of the latter and projecting upwardly and forwardly (Figure 2) therefrom. The free ends of the arms 90 and 92 are linked together by a bar 94 the offset ends of which extend through openings 96 and 98 in the members 90 and 92.

The guard assembly normally occupies the position shown in Figure 2 and the top member 42 is locked in this position by a lock assembly including a stud 100, a threaded portion of which extends upwardly through the top cover 42 and is held in place by an acorn nut 102. The shank of the member 100 is grooved and is adapted to extend downwardly through a spring clip 104 secured by screws 106 to the bearing support member 22. The spring clip 104 has a central opening, not shown, adapted to snugly receive the grooved portion of the shank in spring lock fit as the top cover is returned to its lower position as shown in Figure 2. When the shell is to be raised again, the shank is freed from the clip by the light force applied in raising the shell.

The guard is thus rigidly supported in the position of Figure 2 in such a manner that noise or rattling which might otherwise be caused by vibration of the drill press in operation is eliminated. The points 70, 76, 74 and 78 are disposed in a straight line when the cover 42 is fully lowered, thus forming a parallelogram in a "dead center" position. This condition results from the fact that the pivots 76, 78 and 80 cannot be located higher without altering the contour of the cover 42. The pivots 70, 74 and 84 cannot be lowered without bringing the links into contact with the drive components.

The upper cover 42 may be raised to the position of Figure 1 to permit access to the driving componets by applying an upward lifting pressure to the forward portion of the cover.

In the absence of the arms 90, 92 and the bar 94 the motion of the links 68 and 72 is to some extent indeterminate and the raising of the front edge of the cover 42 may raise the forward link 72 without producing corresponding motion of the rearward link 68 or may move pivot 76 downwardly with the result that the linkage mechanism will jam when the shell reaches a very slightly raised position. However, the arms 90 and 92 and the bar 94 completely eliminate this difficulty by providing a secondary parallelogram with pivot points 70, 74, 98 and 96 which is always well out of dead center position. Accordingly, any lifting force applied to the forward portion of the cover 42 tends to rotate the link 72 counterclockwise about the pivot 74 and because of the arm 92, the bar 94, and the arm 90, identical motion of the rear link 68 is produced thus assuring a smooth, even motion of the entire linkage system and the top cover member until the linkage comes to rest against the abutments 86 and 88 at which time the upper shell is in its fully raised position and all parts of the drive assembly are fully accessible to the operator.

From the foregoing, it will be apparent that the objects of the present invention have been attained by the provision of a guard assembly fabricated from relatively simple, inexpensive components which, when disposed in one operative position, encloses all of the operating components of the drill press head assembly and which may be easily and smoothly raised to a position to provide access to all of these components.

The inexpensive lower member 40 replaces the much more complicated member previously formed integrally with the head casting 20 at relatively high cost. The fiberglass construction of both of the guard members permits the use of relatively inexpensive dies, provides a structure which is light in weight, durable and of pleasing appearance.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A guard assembly for a drive unit of a drill press or other machine tool having drive components projecting upwardly from a body member comprising a shell-like guard member shiftable between a lowered position to substantially enclose said drive components and a raised position to permit free access to said drive components, a pair of substantially coplanar links each pivotally connected at one end to said body member and at the other end to said shell-like member at one side thereof, said pivotal connections being aligned when said shell-like guard member is in said lowered position, arms rigid with the respective links and projecting laterally therefrom, a link member pivotally connected to the free ends of said arms, said body member, said links and said shell-like member forming a first parallelogram system, and said body member, said arms and said link member forming a secondary parallelogram system to assure the smooth, positive operation of said first parallelogram system through its entire operating range, and an additional link pivotally connected at its respective ends to said body member and said shell-like member at the opposite side of said shell-like member.

2. A guard assembly for a machine tool having drive components projecting upwardly from a body member comprising a guard member shiftable between a lowered position to substantially enclose said drive components and a raised position to permit free access to said drive components, a pair of links each pivotally connected at one end to said body member and each pivotally connected at the other end to said guard member at one side thereof, said pivotal connections being in substantially the same plane when said guard member is in said lowered position, arms rigid with the respective links and projecting laterally therefrom, a link member pivotally connected to the free ends of said arms to insure movement of said links in unison when the guard member is moved from its lowered position to its raised position, a single link disposed at the opposite side of said guard member, said single link being pivotally connected at one end to said body member and being pivotally connected at its opposite end to said guard member at points substantially directly opposite the pivotal connections at the ends of one of said pair of links, all of said links being wholly within said guard member and being completely concealed when said guard member is shifted to said lowered position.

3. The guard assembly according to claim 2 together with stops rigid with said body and engageable by certain of said links when said guard member reaches said raised position.

References Cited in the file of this patent

UNITED STATES PATENTS

| | | |
|---|---|---|
| D. 149,664 | Nisenson | May 18, 1948 |
| 1,033,448 | Mueller | July 23, 1912 |
| 1,059,221 | Saylor | Apr. 15, 1913 |
| 1,305,763 | Zeh | June 3, 1919 |
| 1,367,954 | Evans | Feb. 8, 1921 |
| 2,202,878 | Tautz | June 4, 1940 |
| 2,318,691 | Huthsing | May 11, 1943 |
| 2,432,628 | O'Connor | Dec. 16, 1947 |
| 2,531,140 | Linde | Nov. 21, 1950 |